US006889290B2

(12) United States Patent
Hong

(10) Patent No.: US 6,889,290 B2
(45) Date of Patent: May 3, 2005

(54) MEMORY MANAGEMENT APPARATUS AND METHOD

(75) Inventor: Joseph N. Hong, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 603 days.

(21) Appl. No.: 09/896,597

(22) Filed: Jun. 29, 2001

(65) Prior Publication Data

US 2003/0005226 A1 Jan. 2, 2003

(51) Int. Cl.[7] .............................................. G06F 12/08
(52) U.S. Cl. ...................... 711/120; 711/104; 711/105; 711/106
(58) Field of Search ................................ 711/101, 104, 711/105, 106, 118, 119, 120, 141, 143, 144

(56) References Cited

U.S. PATENT DOCUMENTS

| | | | | |
|---|---|---|---|---|
| 4,608,666 | A | * 8/1986 | Uchida | ........................ 365/222 |
| 5,680,570 | A | * 10/1997 | Rantala et al. | ............... 711/113 |
| 6,134,634 | A | 10/2000 | Marshall, Jr. et al. | ....... 711/143 |
| 6,282,617 | B1 | * 8/2001 | Tirumala et al. | ............ 711/133 |
| 6,515,759 | B1 | * 2/2003 | Smith | ........................ 358/1.15 |

OTHER PUBLICATIONS

Lee et al., "Non-refreshing Dynamic RAM for On-chip Cache Memories", 1990 IEEE Symposium on VLSI Circuits, p. 111–112.*

* cited by examiner

Primary Examiner—Gary Portka
(74) Attorney, Agent, or Firm—Schwegman, Lundberg, Woessner & Kluth, P.A.

(57) ABSTRACT

Cache memory systems, microprocessors, and computer systems, as well as methods of operating a cache memory system are described. The cache memory system includes a cache memory controller coupled to a dynamic cache memory and a static cache memory. The cache memory system provides the advantages of using dynamic memory (having a small circuit real estate requirement) for cache read operations, and static memory for cache write operations. Using the static memory for cache write operations allows the cache memory system to function as a write-back cache, instead of an instruction-only, or write-through cache.

29 Claims, 4 Drawing Sheets

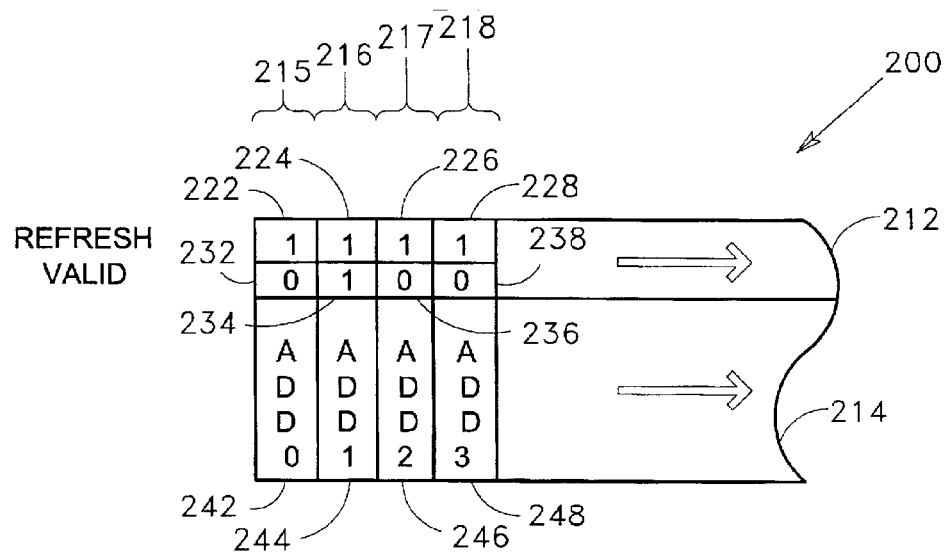
Fig. 2A
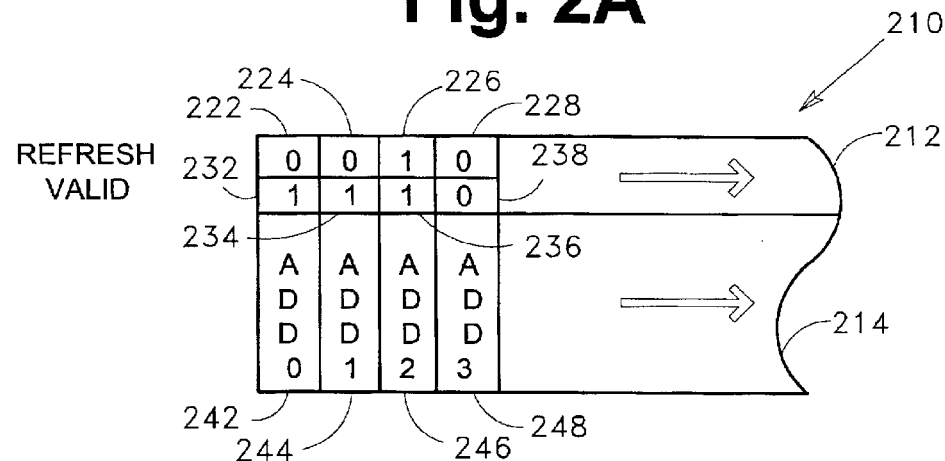
Fig. 2A'
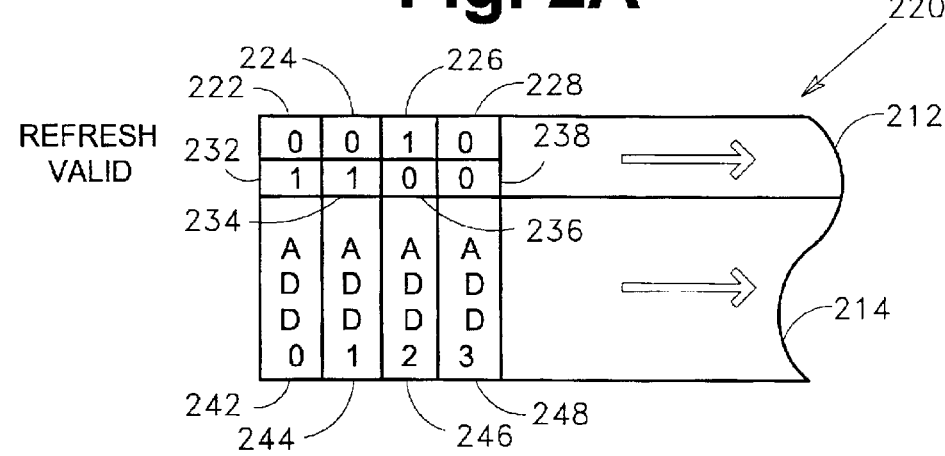
Fig. 2A"

MEMORY MANAGEMENT APPARATUS AND METHOD

FIELD OF THE INVENTION

The present invention relates generally to methods and apparatus for managing access to computer memory. More particularly, the present invention relates to methods and apparatus which are used to cache computer memory for improved access speed.

BACKGROUND OF THE INVENTION

As computer circuit design clock speeds increase, the rate at which data in the main memory of a computer can be accessed becomes all-important in the final determination of system performance. In modem computers, cache memories, or "caches" are used to store a portion of the contents of main memory that are likely to be re-used. Caches are typically smaller and faster than main memory, and are used to hide the latencies involved in using the main memory for storing and retrieving memory operands. Typical cache access times are about five to thirty times faster than main memory access times, significantly increasing overall system performance. Thus, while cache memories are not limited to use with central processing units (CPUs), their primary application is to store memory operands required by one or more CPUs (as opposed to other users of data) for rapid recall, obviating the need to access the slower main memory.

There can be more than one cache used to speed up access to main memory in a computer system. In fact, it is well known in the art to provide multiple levels of caches. For example, a CPU may be provided with a level one (L1) cache on the same integrated circuit as the CPU, and a larger, slower level two (L2) cache in the same module as the CPU. Alternatively, the L2 cache may be provided as a completely separate set of memory circuitry, apart from the CPU module. The L2 cache is typically used to speed up access to the main computer memory (i.e., accesses to the main memory are "cached," or stored, by the L2 cache), while the L1 cache is typically used to speed up access to the L2 cache (i.e., accesses to the L2 cache are cached by the L1 cache). In the discussion that follows, it will be assume loaded into a single cache from main memory. However, it should be understood that such operands may also be loaded from a lower level cache into a higher level cache, if appropriate.

Since cache memories are typically smaller than the main memories to which they are coupled, a strategy may be used to determine which contents of the main memory are to be stored in the cache. One of the simplest such cache organizations is the direct-mapped cache organization.

A cache is usually organized in "lines" or groups of bytes, and not as a single group of individual bytes. Thus, each cache line is used to store a small contiguous range of main memory contents, such as 32 or 64 bytes. In a direct-mapped cache, a portion of the main memory address is used as an index, and the remainder of the main memory address (not including any bits of the main memory address that represent bytes within a cache line) is used as a tag. The number of bits used for the index corresponds to the size of the cache. For example, a direct-mapped cache having 64 cache lines will have a corresponding six-bit index (i.e., since $2^6=64$). When a read operation occurs and the memory operand is not in the cache (i.e., the tag does not match, or there is a "cache miss"), the memory operand is fetched from main memory and stored in the cache line corresponding to the index, and the tag is stored in a tag field associated with the cache line. Assuming the memory operand is still in the cache (i.e., the tags match, or there is a "cache hit") the next time a read operation occurs, the memory operand will be retrieved directly from the cache.

Continuing to use the example of a direct-mapped cache, for any given byte in the main memory, there is only one cache line in which the byte can be stored. Therefore, if the cache line is already in use, the old contents of the cache line are simply overwritten with the new contents. If the old contents are the result of a previous memory operand write operation, and have not yet been copied back to main memory, the cache line is known in the art as a "dirty" cache line, and must be written back to main memory before the new contents can be stored therein. This replacement process is effected by what is known as a "write-back" cache. However, if the old contents in the cache line are identical to the contents in main memory (because they were written to main memory about the same time they were written to the cache line), the old contents may be overwritten (i.e., evicted) directly, without having to write back to main memory. This process, which is slower, but provides a more up-to-date picture of the true main memory content, is effected by what is known as a "write-through" cache.

Designers have a choice of memory types which can be used to construct on-chip cache memory circuitry. As opposed to Static Random Access Memory (SRAM), on-chip Dynamic Random Access Memory (DRAM) may be chosen to save valuable chip surface area for other functions, but requires periodic refresh activity, which complicates the design. In addition, if refresh operations do not occur in a timely fashion, the entire cache is invalidated, which degrades processor performance and increases the number of cache misses. While the solution of selective invalidation using a REFRESH bit for each cache entry has been offered in an attempt to circumvent the need for refreshing a DRAM cache, such designs have been limited to instruction-only (i.e., read-only) or write-through caches, ensuring that an up-to-date copy of the cache always resides outside of the cache. Excluding the use of write-back operations in conjunction with a DRAM cache allows entry invalidation and/or refresh operations to proceed without considering the need for complicated write-back activity. However, in applications where performance is paramount, a write-back cache may be highly desirable, especially if no L2 cache is available.

Thus, there is a need in the art for methods and apparatus which foster the extensive use of DRAM as a part of cache memory to conserve valuable circuit real-estate. Such methods and apparatus should also provide cache designers with the option of using a write-back cache whenever that function is needed or desired, without undue interference in processor data processing activity.

BRIEF DESCRIPTION OF THE DRAWINGS

FIGS. 2A and 2B are exemplary diagrams of the state of cache entry bits used in the read and write portions, respectively, of a cache memory system constructed according to an embodiment of the present invention;

DESCRIPTION OF THE PREFERRED EMBODIMENTS

Figure 1:
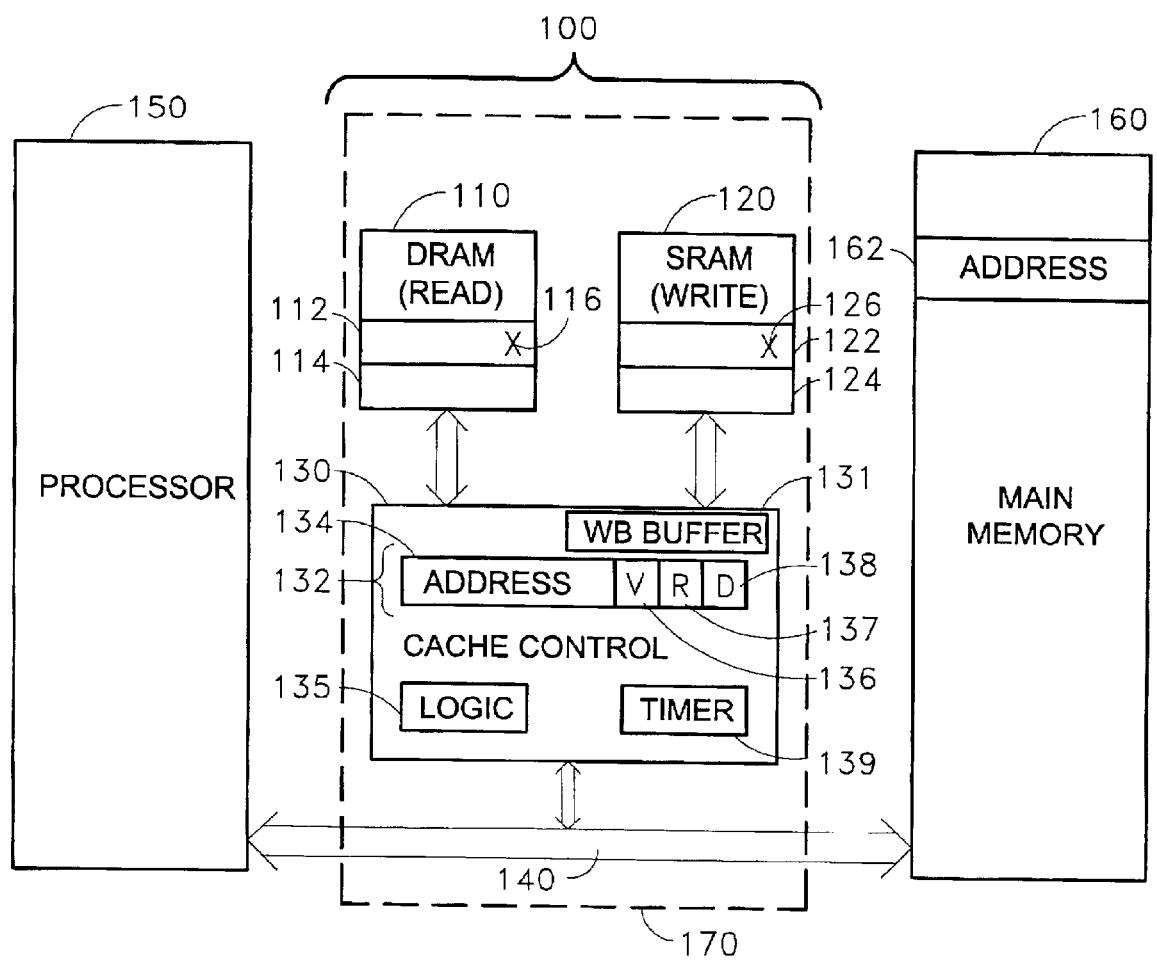
FIG. 1 is a schematic block diagram of a cache memory system constructed according to an embodiment of the present invention.

In the following detailed description of the embodiments, reference is made to the accompanying drawings which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in the art to practice the invention. Other embodiments may be utilized and derived therefrom, such that structural, logical, and electrical circuit substitutions and changes may be made without departing from the scope of the invention. The following detailed description, therefore, is not to be taken in a limiting sense, and the scope of the invention is defined only by the appended claims, along with the full range of equivalents to which such claims are entitled.

According to the teachings of the present invention, a cache memory system is described, and includes a cache memory controller coupled to a dynamic cache memory and a static cache memory. The cache memory system may provide the advantages of using dynamic memory (minimizing the use of circuit real estate) for cache read operations, and static memory for cache write operations. Since cache reads typically outnumber cache writes by a factor of about 3:1, the size (number of memory locations) of the static cache memory may be about one-third that of the dynamic memory. In addition, using the static memory for cache write operations may allow the cache memory system to function as a write-back cache, instead of merely an instruction-only, or write-through cache, as would be the case if dynamic memory was used to cache memory operands from both read and write operations.

For clarity, the fundamental operational principles of the cache memory system will be explained briefly, prior to referring to the figures and describing the memory structure in detail. The following discussion assumes a 64 Mbyte main memory, a 512 KB direct-mapped cache memory (divided equally between dynamic cache memory and static cache memory), and 32 byte cache lines. Of course, while the direct-mapped cache is used here as part of a simplified example, there are other, more complicated ways of organizing a cache, such as the fully-associative cache and the set-associative cache, well-known to those skilled in the art.

The cache memory system may operate whenever the associated processor reads from or writes to the main memory. Simultaneously, the cache memory controller begins to check if the information requested is in the cache memory system and also the process of either reading or writing from/to the main memory. If there is a cache hit (i.e., the information is in the cache memory system), the system will cancel the partially-completed request to operate on the main memory, if appropriate.

The cache controller checks for a hit by looking at the address sent by the processor. The lowest five bits (A0 to A4) may be ignored, because these differentiate between the 32 different bytes in the cache line (i.e., the cache will always return 32 bytes and let the processor decide which are truly required). The next 14 address lines (A5 to A18) represent the line in the cache that will be checked. The cache memory controller then reads the tag memory at the address indicated by the address lines A5 to A18. If the address line bits indicate address 10FFh, for example, the controller will examine the contents of tag memory entry number 10FFh, comparing the bits that it reads from the tag memory at this location to the address bits it receives from the processor. If they match (i.e., a cache hit), then the controller knows the entry in the cache at that line address is the one needed by the processor. If there is no match, then this is counted as a cache miss. The operations following such a miss will be discussed below.

If there is a cache hit, for a read operation the cache controller reads the 32-byte contents of the dynamic memory cache data store at the same line address and sends them to the processor (provided they are still valid, as will be explained below). The read underway from the system RAM is canceled and the process is complete.

For a write operation, the cache controller writes 32 bytes to the data store at that same cache line location referenced previously, however, the static cache memory is used. Then, since the cache memory system of the present invention is a write-back cache, the pending write to main memory is canceled, and the dirty bit for this cache line is set to 1 to indicate that the static cache memory was updated, but the main memory was not.

Referring now to FIG. 1, a schematic block diagram of a cache memory system constructed according to the teachings of the present invention can be seen. The cache memory system 100 includes a cache memory controller 130 coupled to a dynamic cache memory 110 and a static cache memory 120. The dynamic cache memory 110 further includes a plurality of addresses 112, 114, as does the static cache memory 120 (i.e., 122, 124). For the purposes of this document, a "dynamic cache memory" may mean a volatile memory which retains the value of stored (i.e., cached) content for less than about 1 second, or some other substantially finite time period, even when power is continuously supplied. In other words, a "dynamic cache memory" may be refreshed periodically by read or write operations, similar or identical to those operations required to refresh the stored content of DRAM memories, well-known to those skilled in the art. Similarly, for the purposes of this document, a "static cache memory" may mean a volatile memory which retains the value of stored (i.e., cached) content for a substantially infinite time period, as long as power is continuously supplied, or a non-volatile memory, such as a flash memory, or an electrically-erasable programmable read-only memory. In other words, a "static cache memory" typically does not need to be refreshed in a fashion similar to DRAM memories, and as such, may be similar to or identical to SRAM memories, well-known to those skilled in the art.

The most obvious problems with using dynamic cache memory is how to obviate the need to refresh the contents of the cache, or if this is impossible, how to minimize the amount of refresh circuitry required. For this reason, while using dynamic memory for a cache memory system has been considered in the past, such use has been limited to instruction caches (i.e., read-only caches) or write-through caches.

The solution to part of the problem can be derived from the concept of "selective invalidation", as introduced by Messrs. Lee and Katz in their article titled "Non-refreshing Dynamic RAM for On-chip Cache Memories", I.E.E.E. Symposium on VLSI Circuits, pgs 111–112, 1990. Selective invalidation, instead of periodically invalidating the entire content of the dynamic cache memory, invalidates only stale cache entries (entries which have not been read or written within a single refresh time period) without interrupting the processor execution stream, and without degrading cache performance due to excessive invalidation. The use of selective invalidation effectively eliminates the need to refresh dynamic cache memory.

The scheme proposed by Lee and Katz relies on three assumptions. First, the cache is used as either an instruction-only or write-through cache (such that up-to-date copies of cache entries reside outside of the cache at all times). Second, each cache block contains one or more sub-blocks; associated with each sub-block is a VALID bit and a REFRESH bit (in Lee and Katz's paper, the cache "sub-block" is the unit of transfer into and out of the cache, and will be referred to hereinafter in the alternative as similar to or identical to a cache "line"). Thus, any subset of sub-blocks can be valid at any given time. Third, any access to the dynamic memory cache is considered as a refresh operation (i.e., this is because a read operation is always followed by a write-back operation for DRAM memory).

In the proposed scheme, an extra bit for each sub-block is added to the VALID bit to hold the refresh status. This bit (i.e., REFRESH) is set at the beginning of each refresh interval, and reset selectively whenever the corresponding sub-block is accessed, regardless of whether the access is a read operation or write operation. At the end of each refresh period, all of the REFRESH and VALID bits are examined. Only those of sub-blocks not accessed during the refresh interval (i.e., REFRESH still is set, or equal to "1") and still valid (i.e., VALID is still set, or equal to "1") are invalidated selectively (i.e., VALID is reset, or equal to "0"). It should be carefully noted that the "refresh interval", or any discussion herein of a "refresh timer" do not refer to actually refreshing the dynamic cache memory. Rather, as will be seen hereinbelow, the dynamic cache memory is never refreshed explicitly, at least in the conventional sense. Only memory locations accessed as cache hits by reading from the dynamic cache memory, or written into the dynamic cache memory, are considered to be refreshed—the rest of the locations are invalidated at the end of the "refresh period", which is typically selected to be about half of the time period wherein a classic refresh operation takes place (usually known as the "refresh time" or "refresh cycle time" by those skilled in the art), such that the dynamic memory capacitors lose charge and the memory contents become invalid. From this discussion, it should be apparent to those skilled in the art that the dynamic cache memory 110 is not connected to periodic refresh circuitry, as is used with conventional dynamic memories.

Thus, as can be seen in FIG. 1, the cache memory system 100 also may include a validity refresh timer 139 coupled to the cache memory controller (and, as shown in FIG. 1, the validity refresh timer 139 may be included as an integral element of the cache memory controller 130). The cache memory system 100 may also include validity comparison logic 135 coupled to the validity refresh timer 139 (the validity comparison logic 135 can also be included as an integral element of the cache memory controller 130).

Finally, as noted above, the dynamic cache memory 110 may have a plurality of addresses 112, 114, which may include a cached address (e.g., 112) having a cached memory operand 116. The cache memory system includes a tag memory 132 including a copy of the cached memory address 134, an operand VALID bit 136, and a validity REFRESH bit 137. As will be explained hereinbelow, the tag memory 132 may further includes a DIRTY bit 138. While not shown in FIG. 1, those skilled in the art will realize that the cache memory controller 130 may communicate with (or include) one or more tag memories 132. If more than one tag memory 132 is used, then it should be noted that the first tag memory can be used to track the dynamic memory cache content, while the second tag memory can be used to track the static memory cache content, for example.

The static cache memory 120, as an element of the cache memory system 100 constructed according to the teachings of the present invention, is used exclusively for storing memory write operations. In other words, the dynamic cache memory 110 is never used to cache memory write operations with regard to the cache memory system 100. Thus, the cache memory controller 130 may also include a DIRTY bit 138 as a part of the tag memory 132, and may communicate with (or contain as an integral element) a write-back buffer 131. This enables the cache memory system 100 to operate as a write-back cache, using the combination of a dynamic cache memory 110 for cache read operations, and a static cache memory 120 for cache write operations. This operative combination is unknown in the prior art, and operates to free cache memory system designers from the constraints imposed by Lee and Katz.

As is well-known to those skilled in the art, the write-back buffer 131 is used to hold the content of each write operation to main memory 160 prior to actual recordation in the main memory 160. And, according to the teachings of the present invention, the write-back buffer 131 is used specifically to hold the content of each write operation to the static cache memory 120. The DIRTY bit 138 is set whenever a new operand is written to the static cache memory, but not yet recorded to the corresponding main memory location. For example, if the operand 126 has only been written to the static cache memory location 122, but not to the corresponding main memory location 162, then the DIRTY bit 138 will be set. However, after the operand 126 is written from the write-back buffer 131 to the corresponding address 162 of the main memory 160, then the DIRTY bit 138 will be reset, since the cache memory address 122 now holds the same operand value as that held by the corresponding main memory address 162.

Thus, while many features of the cache memory controller 130 may be similar to or identical to commonly available cache memory controllers, such as that included in the Intel SL385 or SL3V2 Pentium III Xeon™ series of microprocessors, the cache memory controller 130 constructed according to the teachings of the present invention makes use of several important additional features (and may include them as an integral part of the cache memory controller 130 circuit design, as well), such as the tag memory 132 having an address portion 134 (corresponding to one of the cached addresses 112, 114, 122, or 124, for example), and several associated bits (i.e., the VALID bit 136, the REFRESH bit 137, and the DIRTY bit 138). As can be seen in FIG. 1, the cache memory controller 130 is in turn typically connected to a bus 140, which places the cache memory controller 130 coupled to the processor module 150 and the main memory 160.

It should also be noted that the cache memory controller 130, the dynamic cache memory 110, and the static cache memory 120 may all be disposed on a single substrate 170, or within a single integrated circuit package 170. Also, as mentioned previously, the dynamic cache memory size (in terms of the number of dynamic cache memory locations) will typically be selected so as to be about three times the static memory size (in terms of the number of static cache memory locations). While this ratio of 3:1 is based on the proportion of read operations to write operations executed by typical microprocessors, the ratio may be selected to be whatever corresponds most closely to the proportion of read:write operations experienced for a particular data processing environment, in accordance with other design constraints.

A particular protocol may be combined with the structure of the cache memory system 100 to make utilization more efficient. For example, when a write is performed by the processor 150, the dynamic cache memory 110 can also checked for a hit in case the line to be written is present in the dynamic cache memory 110 (i.e., a previous memory read operation placed the line of data into the dynamic cache memory 110). If the line is found in the dynamic cache memory 110, the line may be transferred to the static cache memory 120. This operation involves reading the entire line from the dynamic cache memory 110, transferring the line to the static cache memory 120, and then writing the new data into the static cache memory 120 using the processor 150. The DIRTY bit 138 for the line in the static cache memory 120 may then be set, and the original line in the dynamic cache memory 110 can be invalidated, freeing that series of memory locations in the dynamic cache memory 110 for future use. In this manner, data is typically not duplicated in multiple locations. Further accesses to the data may occur within the static cache memory 120, and an eviction from the static cache memory 120 can be handled in the conventional fashion, well known to those skilled in the art. If this protocol is used, data will typically never need to be evicted from the dynamic cache memory 110.

Referring now to FIG. 2A, exemplary diagrams of the state of entry bits 312 (i.e., the REFRESH and VALID bits) and tag memory addresses 314 corresponding to dynamic cache memory for read operations from main memory locations within a cache memory system constructed according to an embodiment of the present invention can be seen. In FIG. 2A, table 200 represents the state of the cache memory entry bits 212 for each of the corresponding tag memory addresses 214 at the beginning of the refresh interval. For reference purposes, the REFRESH bits 222, 224, 226, and 228 (relating to the state of the operands stored in the dynamic memory cache for the corresponding main memory addresses 242, 244, 246, and 248, respectively) are equivalent to the bit 137 (and the address 134) shown in FIG. 1. Similarly, the VALID bits 232, 234, 236, and 238 (relating to the state of the operands stored in the dynamic cache memory addresses 242, 244, 246, and 248, respectively) are equivalent to the bit 136 (and the address 134) shown in FIG. 1.

Table 210 illustrates the cache state in the middle of the refresh interval, and table 220 illustrates the cache state at the end of the refresh interval. Each of the tables 200, 210, and 220 in FIG. 2A may represent, for example, the condition of the cache entry bits 212 as various operations are conducted using the dynamic cache memory.

Thus, with regard to the first table 200, the VALID bits 232, 234, 236, and 238 reflect the status of the operands contained within the memory locations of the dynamic cache memory corresponding to the main memory addresses referenced by ADD0, ADD1, ADD2, and ADD3, respectively. That is, the operands contained in the dynamic cache memory locations corresponding to ADD0, ADD2, and ADD3 are invalid, while the operand contained in the dynamic cache memory location corresponding to ADD1 is valid. Assuming that the entire dynamic cache memory has been accessed (read from or written to) recently, all of the REFRESH bits 222, 224, 226, and 228 are set. As can be seen in table 210, however, some time after the refresh operation has occurred, but before a new refresh operation is conducted, REFRESH bits 222, 224, and 228 are reset, indicating additional accesses (i.e., either read or write operations) to the dynamic cache memory locations corresponding to ADD0, ADD1, and ADD3. Thus, as can be seen in table 220, just before the end of the refresh interval, the VALID bit 236 will be reset to indicate that the content of the dynamic cache memory location corresponding to ADD2 is invalid (i.e., the content of the dynamic cache memory corresponding to ADD2 has now been selectively invalidated), because there has been no read or write access to this location since the beginning of the current refresh interval.

Figure 2B:
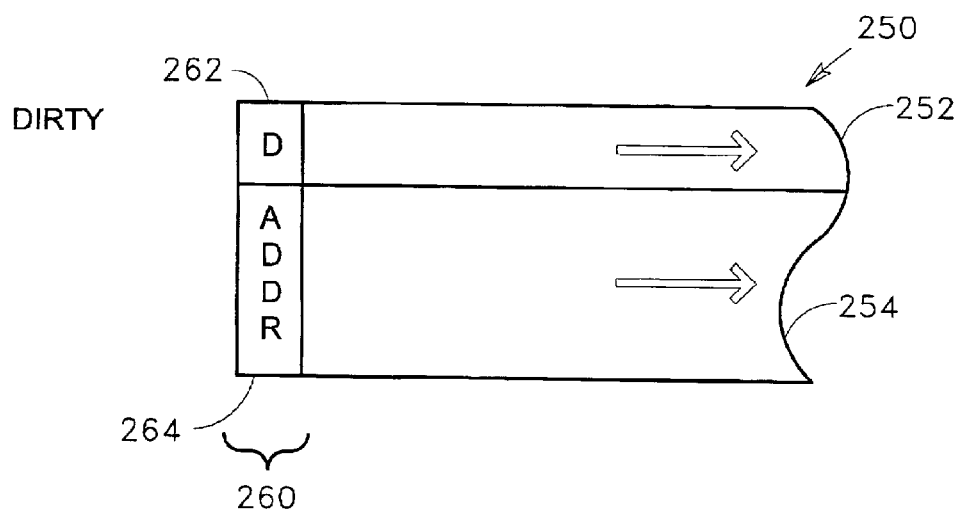

Referring now to FIG. 2B, an exemplary diagram 250 of the state of the entry bits 252 (i.e., the DIRTY bit) and tag memory addresses 254 corresponding to the static cache memory locations of a cache memory system constructed according to the teachings of the present invention can be seen. For reference purposes, the DIRTY bit 262 (relating to the state of the operand stored in the static cache memory address 364) corresponds to the bit 137 (and the address 134) shown in FIG. 1. Thus, when a new operand, destined eventually to be written to the main memory address referenced by ADDR is stored in the static cache memory, the DIRTY bit 262 will be set. After writing the stored operand from the write-back buffer to the main memory, however, the DIRTY bit will be reset.

As mentioned above, the tag memory for the dynamic cache memory may include VALID, REFRESH, and DIRTY bits for tracking the content of both the dynamic cache memory and the static cache memory. In this case, the addresses 214, 254 may correspond to locations in either cache memory, and the cache line 215, for example, may be identical to the cache line 260, for example. However, the invention may also be implemented such that there is a separate tag memory for the dynamic memory cache, and the static memory cache. In this case, the tag memory for the dynamic memory cache will not include a DIRTY bit. Likewise, the separate tag memory for the static cache memory will not include VALID or REFRESH bits. Thus, the cache lines 215, 216, 217, and 218 may not correspond in any direct way to the cache line 260, for example.

Figure 3:
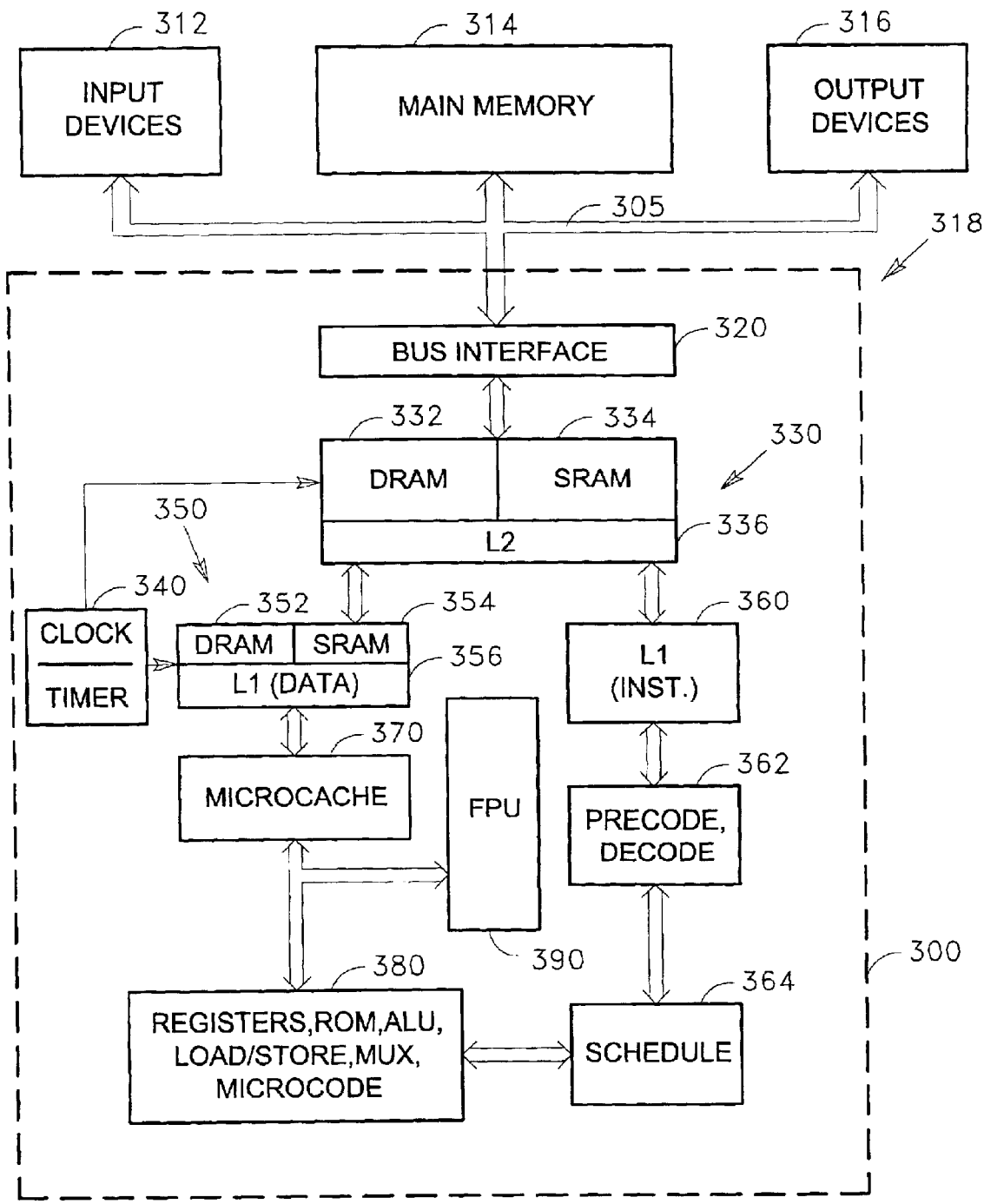
FIG. 3 is a schematic block diagram of a microprocessor and computer system constructed according to an embodiment of the present invention.

Referring now to FIG. 3, a schematic block diagram of a microprocessor and computer system constructed according to the teachings of the present invention can be seen. The microprocessor 300 includes a bus interface 320, which facilitates communication with one or more peripheral buses 305, such as the Peripheral Component Interconnect/Interface (PCI) local bus architecture, the Industry Standard Architecture (ISA) bus, and the Extended Industry Standard Architecture (EISA) bus. Using the peripheral bus 305, the microprocessor 300 can be placed into electronic communication with the main memory 314, input devices 312, such as a mouse and keyboard, and output devices 316, such as a display and printer, so as to form a computer system 318.

The microprocessor 300 may include a unified (Level 2) L2 cache 330 to receive data and instructions from the bus interface 320. The L2 cache 330, in turn, may be connected to two Level 1 (L1) caches: an L1 data cache 350, and an L1 instruction cache 360. The L1 data cache receives and transmits all data from/to the bus interface 320, while the L1 instruction cache is dedicated to receiving instructions from the bus interface 320. The L2 cache is only accessed when there is a miss from one of the L1 caches 350, 360, and the L1 cache is only accessed if there microcache 370 (which can be considered a Level 0 or L0 cache). If the processor 300 is of the superscalar type, there will be multiple execution units to operate on data received from the bus 320, including arithmetic logic units, registers, multiplexers, and microcode sequencers, etc., all represented by the logic block 380. The multiple execution units within the logic block 380 are controlled, in turn, by multiple pipelines, formed by the instruction fetch, pre-decode, and decode units represented by the logic block 362, and the scheduler 364.

As shown in FIG. 3, the microprocessor 300 includes a processor module 390, such as the floating point unit (FPU) in direct or indirect electronic communication with the cache memory system, such as the L1 cache 350 and/or the L2 cache 330 constructed in accordance with the teachings of the present invention. Therefore, either one, or both the L1 and L2 caches 350 and 330 (and even the microcache 370) may be similar to or identical to the cache memory system 100 illustrated in FIG. 1, including the use of data entry bits and addresses 212, 252 and 214, 254, respectively, shown in FIGS. 2A and 2B. Thus either one, or both of the cache memory systems 330, 350 may include a cache memory controller 336, 356 coupled to a dynamic cache memory 332, 352 and a static cache memory 334, 354. The microprocessor 300 may further include, as a separate element, or within the cache memory systems 330, 350, a validity refresh timer (which may be derived from, or taken directly from the master clock logic 340) coupled to the cache memory controllers 336, 356. Similarly, the microprocessor 300 may include validity comparison logic (as a separate element, or as a distinct part of the cache memory systems 330, 350) coupled to the validity refresh timer, as shown and described for FIG. 1.

As noted previously, the dynamic cache memories 332, 352 will typically have a plurality of addresses for storing cached memory operands which result from read operations to the main memory 314. Each cache memory system 330, 350 will also include a tag memory with operand VALID and REFRESH bits corresponding to the operand status in each of the storage locations contained within the dynamic cache memories 332, 352. Similarly, each cache memory system 330, 350 will also include a tag memory that has operand DIRTY bits corresponding to the operand status in each of the storage locations contained within the static cache memories 334, 354. Each cache memory system 330, 350 may also include a write-back buffer for buffering operand writes back to the main memory 314 from the static cache memories 334, 354. As can be seen from FIG. 3, the processor module 390 and the cache memory controller may be disposed on a single substrate 300, or within a single circuit module package 300.

It will be understood by those of ordinary skill in the art that the embodiments shown in FIGS. 1–3 illustrate a cache memory system, microprocessor, and computer system which include a cache memory controller coupled to a dynamic cache memory and a static cache memory. Thus, one of ordinary skill in the art will understand, upon reading this description, that the memory management circuitry of the present invention can be used in applications other than for cache memory systems, microprocessors, and computer systems, and thus, the invention is not to be so limited. The illustrations of a cache memory system 100, microprocessor 300, and computer system 318 in FIGS. 1 and 3 are intended to provide a general understanding of some applications which may be served by the structure and circuitry of the present invention, and are not intended to serve as a complete description of all the elements and features of microprocessors or computer systems which make use of the novel memory management circuitry and structures described herein.

Applications which may include the novel memory management circuitry of the present invention as described in this document include electronic circuitry used in high-speed computers, arrays of memory modules and other circuit cards, device drivers, power modules, communication circuitry, modems, processor modules, memory integrated circuits, embedded processors, and application-specific modules, including multilayer, multi-chip modules. Such circuitry may further be included as sub-components within a variety of electronic systems, such as televisions, cellular telephones, personal computers, aircraft, and others.

FIGS. 1–3 are similarly useful in presenting the application of various methods which may be carried out according to the present invention. Those of ordinary skill in the art will realize that various elements of the cache memory systems, microprocessors, and computer systems of the present invention may be assembled and used in accordance with the structures described in the various figures.

It should be noted that numerous methods of operating cache memory systems have been devised, and the specific method used often depends on a complex analysis of the usage environment and physical construction for the particular cache memory system being considered. Therefore the method described below may or may not be the best method to implement for a specific operating environment or physical arrangement of electronic devices in a circuit constructed according to the present invention. Thus, the following method is merely to be considered by way of example, and not by way of limitation.

Figure 4:
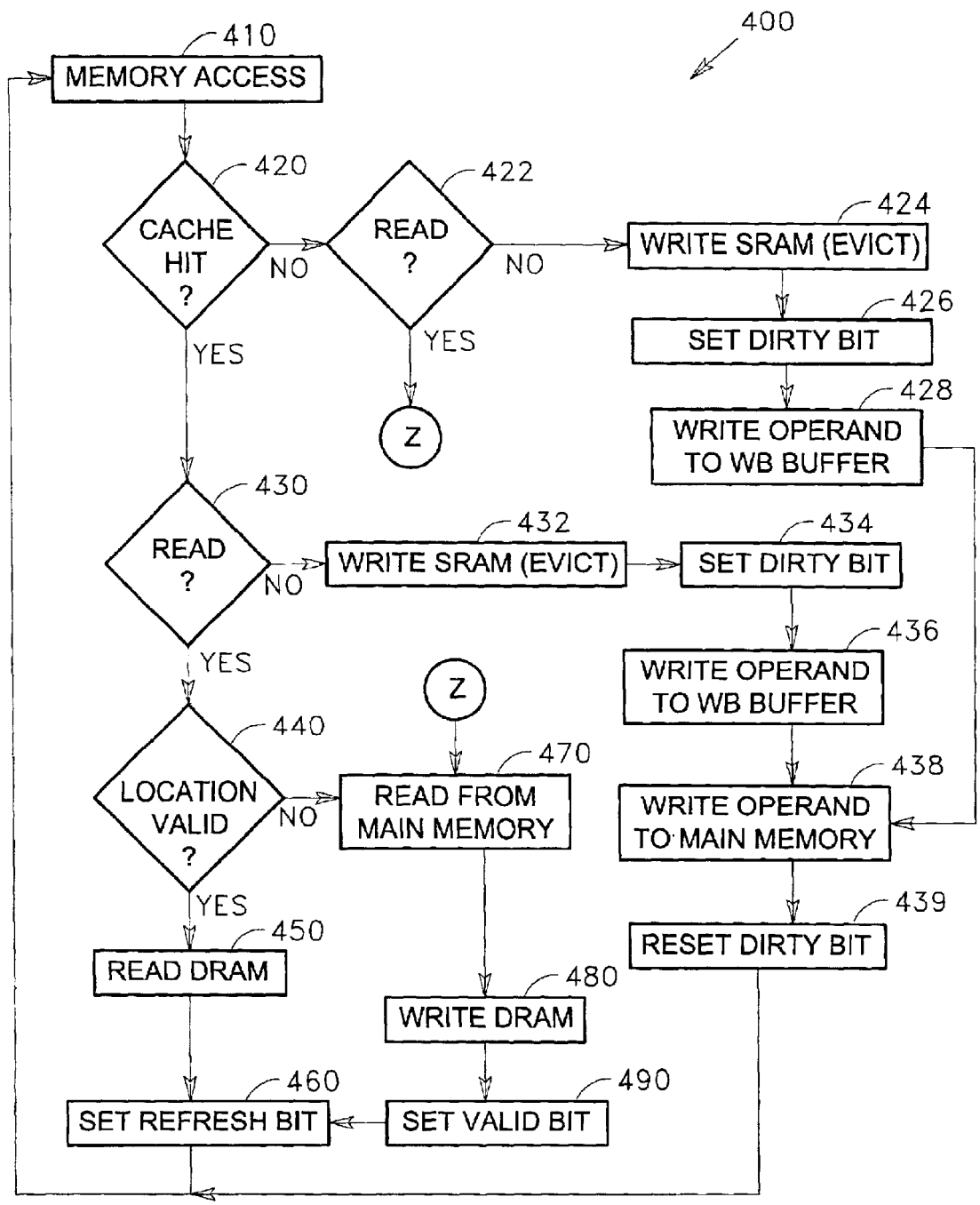
FIG. 4 is a flow chart diagram of a method of operating a cache memory system according to an embodiment of the present invention.

Referring now to FIG. 4, a flow chart diagram of an exemplary method of operating a cache memory system according to the teachings of the present invention can be seen. The method 400 of operating a cache memory system begins with detecting an attempt to access a main memory location in step 410 in conjunction with an operand value to be written to, or read from, a location in the main memory. If a cache memory hit is detected (corresponding to the main memory location) in step 420, then a determination is made as to whether the attempt is a memory read operation, or a memory write operation, in step 430.

If it is determined that the attempt is a memory read operation, then a determination is made as to whether the dynamic cached value in the dynamic cache memory location (corresponding to the main memory location) is valid in step 440. At this point, the cache controller validity comparison logic will determine whether the VALID bit for the dynamic cache memory location is still set. If so, then the dynamic cached value is still valid, and the dynamic cached value may be assigned to the operand value by reading directly from the dynamic cache memory location into the operand value in step 450. Since the dynamic cache memory location has been accessed in step 450, the REFRESH bit corresponding to the dynamic cache memory location can be set in step 460. The method then continues by returning to await detection of further attempts to access main memory in step 410.

If the cache controller validity comparison logic determines that the dynamic cached value is invalid in step 440 (i.e., the VALID bit has been reset), then the value of the operand is obtained by reading directly from the main memory location in step 470, and the retrieved operand value is written to the dynamic memory cache in step 480. The VALID bit corresponding to the newly-written dynamic cache memory location can then be set in step 490, and the REFRESH bit can be set in step 460, reflecting the updated status of the main memory and newly-accessed dynamic cache memory locations. At this point, the method continues by returning to await detection of further attempts to access main memory in step 410.

If it is determined that the attempt to access main memory is a memory write operation in step 430, then the method continues with step 432 by assigning the operand value to a static cached value of a static cache memory location, over-writing the least-recently used static cache memory location (or some other location in the static cache memory determined by algorithms well known to those skilled in the art). This usually occurs by writing the operand value directly into the static cache memory. The DIRTY bit will then be set in step 434, indicating that while the operand has been written into the static cache memory, it has not yet been written into the corresponding main memory location.

The method then typically continues with writing the static cached value into a write-back buffer location in step 436, and, when the opportunity presents itself, writing the static cached value from the write-back buffer into the main memory location at step 438. The DIRTY bit can then be reset at step 439. At this point, the method continues by returning to await detection of future attempts to access the main memory in step 410.

If a cache memory miss corresponding to the attempted access of a main memory location is detected at step 420, and the attempt is determined to be a memory read operation in step 422, then the method continues with obtaining the value of the operand by reading directly from the main memory location in step 470, and writing the operand value to the dynamic memory cache in step 480. If necessary, the least-recently used dynamic cache memory location (or some other location in the dynamic cache memory determined by algorithms well known to those skilled in the art) can be overwritten with the operand value. The VALID bit corresponding to the newly-written dynamic cache memory location can then be set in step 490, and the REFRESH bit can be set in step 460, reflecting the updated status of the main memory and newly-accessed dynamic cache memory locations. At this point, the method continues by returning to await detection of further attempts to access the main memory in step 410.

If a cache memory miss corresponding to the main memory location is detected at step 420, and the attempt is determined to be a memory write operation in step 422, then the method continues with step 424 by assigning the operand value to a static cached value of a static cache memory location, over-writing the least-recently used static cache memory location (or some other location in the static cache memory determined by algorithms well known to those skilled in the art) if necessary. This usually occurs by writing the operand value directly into the static cache memory. If necessary, a copy of the over-written value may be first transferred to the write-back buffer, or even to main memory, depending on the write-back algorithm in use. The DIRTY bit will then be set in step 426, indicating that while the new operand has been written into the static cache memory, it has not yet been written into the corresponding main memory location.

The method the typically continues with writing the static cached value into a write-back buffer location in step 428, and, when the opportunity presents itself, writing the static cached value from the write-back buffer into the main memory location at step 438. The DIRTY bit can then be reset at step 439. At this point, the method continues by returning to await detection of further attempts to access the main memory in step 410.

Although specific embodiments have been illustrated and described herein, it will be appreciated by those of ordinary skill in the art that any arrangement which is calculated to achieve the same purpose may be substituted for the specific embodiment shown. This application is intended to cover any and all adaptations or variations of the present invention. It is to be understood that the above description has been made in an illustrative fashion, and not a restrictive one. Combinations of the above embodiments, and other embodiments not specifically described herein will be apparent to those of skill in the art upon reviewing the above description. The scope of the invention includes any other applications in which the above structures, circuitry, and fabrication and assembly methods are used. The scope of the invention should be determined with reference to the appended claims, along with the full range of equivalents to which such claims are entitled.

What is claimed is:

1. A cache memory system, comprising:
   a cache memory controller to provide a cache hit associated with an operand value and one of a main memory read operation and a main memory write operation;
   a dynamic cache memory having a dynamic cached value to be assigned to the operand value responsive to the cache hit associated with the main memory read operation; and
   a static cache memory having a static cached value to be assigned from the operand value responsive to the cache hit associated with the main memory write operation.

2. The cache memory system of claim 1, wherein the dynamic cache memory is not connected to circuitry that operates to periodically refresh the dynamic cache memory.

3. The cache memory system of claim 1, further including:
   a validity refresh timer coupled to the cache memory controller.

4. The cache memory system of claim 3, further including:
   validity comparison logic coupled to the validity refresh timer.

5. The cache memory system of claim 1, wherein the dynamic cache memory has a plurality of addresses including a cached address having a cached memory operand, further comprising:
   a tag memory location referenced to the cached memory address;
   an operand VALID bit; and
   an operand REFRESH bit.

6. The cache memory system of claim 5, wherein the tag memory further includes an operand DIRTY bit.

7. The cache memory system of claim 1, wherein the static cache memory has a plurality of addresses including a cached address having a cached memory operand, further comprising:
   a tag memory referenced to the cached memory address; and
   an operand DIRTY bit.

8. The cache memory system of claim 7, further including:
   a write-back buffer coupled to the cache memory controller.

9. The cache memory system of claim 1, wherein the cache memory controller, the dynamic cache memory, and the static cache memory are all disposed on a single substrate.

10. The cache memory system of claim 1, wherein the cache memory controller, the dynamic cache memory, and the static cache memory are all disposed within a single integrated circuit package.

11. The cache memory system of claim 1, wherein the dynamic cache memory has a dynamic memory size, wherein the static cache memory has a static memory size, and wherein the dynamic memory size is about three times the static memory size.

12. A microprocessor, comprising:
    a processor module; and
    a cache memory system coupled to the processor module, the cache memory system comprising:
      a cache memory controller to provide a cache hit associated with an operand value and one of a main memory read operation and a main memory write operation;
      a dynamic cache memory having a dynamic cached value to be assigned to the operand value responsive to the cache hit associated with the main memory read operation; and
      a static cache memory having a static cached value to be assigned from the operand value responsive to the cache hit associated with the main memory write operation.

13. The microprocessor of claim 12, further including:
    a validity refresh timer coupled to the cache memory controller.

14. The microprocessor of claim 13, further including:
    validity comparison logic coupled to the validity refresh timer.

15. The microprocessor of claim 12, wherein the dynamic cache memory has a plurality of addresses including a cached address having a cached memory operand, further comprising:
    a tag memory location referenced to the cached memory address;
    an operand VALID bit; and
    an operand REFRESH bit.

16. The microprocessor of claim 15, wherein the tag memory further includes an operand DIRTY bit.

17. The microprocessor of claim 12, wherein the static cache memory has a plurality of addresses including a cached address having a cached memory operand, further comprising:

a tag memory location referenced to the cached memory address; and an operand DIRTY bit.

18. The microprocessor of claim 12, further including:

a write-back buffer coupled to the cache memory controller.

19. The microprocessor of claim 12, wherein the processor module and the cache memory controller are disposed on a single substrate.

20. A computer system, comprising:

a main memory; and a microprocessor coupled to the main memory, the microprocessor comprising:

a processor module; and a cache memory system coupled to the processor module, the cache memory system comprising:

a cache memory controller to provide a cache hit associated with an operand value and one of a main memory read operation and a main memory write operation;

a dynamic cache memory having a dynamic cached value to be assigned to the operand value responsive to the cache hit associated with the main memory read operation; and a static cache memory having a static cached value to be assigned from the operand value responsive to the cache hit associated with the main memory write operation.

21. The computer system of claim 20, wherein the dynamic cache memory has a plurality of addresses including a cached address having a cached memory operand, further comprising:

a tag memory location referenced to the cached memory address;

an operand VALID bit; and an operand REFRESH bit.

22. The computer system of claim 21, wherein the tag memory further includes an operand DIRTY bit.

23. A method of operating a cache memory system, comprising:

detecting an attempt to access a main memory location in conjunction with an operand value;

if the attempt is a memory read operation, then:
determining that a dynamic cached value in a dynamic cache memory location corresponding to the main memory location is valid;
assigning the dynamic cached value to the operand value; and
setting a REFRESH bit corresponding to the dynamic cache memory location;

otherwise, if the attempt is a memory write operation:
assigning the operand value to a static cached value of a static cache memory location; and
setting a DIRTY bit corresponding to the static cache memory location.

24. The method of claim 23, further including:

writing the static cached value into a write-back buffer location; and writing the static cached value from the write-back buffer into the main memory location.

25. The method of claim 23, further including:

detecting a cache memory hit corresponding to the main memory location.

26. The method of claim 23, further including:

determining whether the attempt is a memory read operation or a memory write operation.

27. A method of operating a cache memory system, comprising:

detecting an attempt to access a main memory location in conjunction with an operand value;

detecting a cache memory miss corresponding to the main memory location:

if the attempt is a memory read operation, then:
reading the operand value from the main memory location;
assigning the operand value to a dynamic cached value in a dynamic cache memory location; and
setting a REFRESH bit corresponding to the dynamic cache memory location;

otherwise, if the attempt is a memory write operation:
assigning the operand value to a static cached value of a static cache memory location; and
setting a DIRTY bit corresponding to the static cache memory location.

28. The method of claim 27, further including:

writing the static cached value into a write-back buffer location; and writing the static cached value from the write-back buffer into the main memory location.

29. The method of claim 27, further including:

determining whether the attempt is a memory read operation or a memory write operation.

* * * * *